United States Patent [19]

Lewis et al.

[11] 4,158,736

[45] Jun. 19, 1979

[54] POLYMERS OF ALKYL ACRYLATES

[75] Inventors: Sheldon N. Lewis, LePlan de Grasse, France; Richard A. Haggard, Fort Washington, Pa.

[73] Assignee: Rohm and Haas Company, Philadelphia, Pa.

[21] Appl. No.: 629,186

[22] Filed: Nov. 5, 1975

Related U.S. Application Data

[63] Continuation-in-part of Ser. No. 241,177, Apr. 5, 1972, abandoned.

[51] Int. Cl.$^2$ .............................................. C07C 69/54
[52] U.S. Cl. ................... 560/205; 560/190; 560/202; 260/307 FA; 260/340.9 R; 260/564; 562/595; 260/348.58; 260/348.48; 260/348.46; 260/448.2 B; 260/465.9; 526/212; 526/279; 526/310; 526/329.2; 260/348.61; 260/348.62
[58] Field of Search ................ 260/486 R, 307, 340.7, 260/561 N, 448.2 B, 465.9; 560/205, 202, 109; 562/595; 548/348.59; 526/212, 279, 310, 329.2

[56] References Cited

PUBLICATIONS

Trekoval and Lim, Journal of Polymer Science Part C, 4 333 (1963).
Stille, J. K. "Introduction to Polymer Chem.", John Wiley & Sons, 48-61, 166-172.

*Primary Examiner*—Paul J. Killos
*Attorney, Agent, or Firm*—Harold L. Greenwald; William E. Lambert, III

[57] ABSTRACT

Polymers of esters of acrylic acid having an average chain length of about 6 to about 30 mers are prepared by an anionic polymerization reaction, carried out in the presence of a catalytic amount of an alkoxide anion. These polymers, their hydrolysis products, and their derivatives have a wide variety of applications, including among others use as components in films, coatings, fibers, impregnants, adhesives, and binders, and use as modifiers, plasticizers, melt flow improvers, and leveling agents.

34 Claims, 3 Drawing Figures

POLYMERS OF ALKYL ACRYLATES

CROSS-REFERENCE TO RELATED APPLICATION

This application is a continuation-in-part of our pending application U.S. Ser. No. 241,177 filed in Apr. 5, 1972.

This invention relates to novel homopolymers and copolymers of esters of acrylic acid, to polymer compositions which comprise these novel polymers, to methods of making the polymers, and to uses of the polymers.

Polymers having relatively low molecular weights, often referred to as oligomers, have recently become of increasing interest, in part due to their use in adhesives, plasticizers, leveling agents, and melt-index improvers, and in formulating coating compositions having very high solids content. While various alkyds, polyesters, polyethers, polyamides, and polyurethanes having molecular weights in the range of 500 to 2500 can be conveniently prepared, suitable acrylic polymers in this molecular weight range have heretofore been inaccessible. Because acrylic polymers have many extremely valuable advantages, including relatively low cost, low color, good outdoor durability, high chemical resistance, and good thermal stability, and because the various non-acrylic low molecular weight polymers with functionalities greater than two are often difficult to prepare, polymer compositions comprising low molecular weight acrylic polymers would be particularly desirable.

Attempts have been made to prepare acrylic polymers having molecular weight distributions in the range of 500 to 5000 by free-radical polymerization techniques. However, these procedures are generally unacceptable, either because high temperatures or high pressures are needed to carry out the polymerization reaction, because chain transfer agents employed in the reaction have objectionable odors or toxicity, or because the properties of the polymer produced in the polymerization reaction are adversely affected by a high incidence of initiator or chain transfer fragments on the polymer chains. Furthermore, it is difficult to control the molecular weight distribution of polymers prepared by free-radical techniques. Thus, such polymers tend to have a broad molecular weight distribution, and contain significant amounts of high and very low molecular weight polymer, which can give unattractive properties to the polymer compositions.

Acrylic telomers of very low molecular weight, less than about 500, are well-known and have been prepared using several types of basic catalysts, including sodium methoxide, sodium phenoxide, and sodium alkoxides in the presence of high alcohol levels. However, these prior art methods have been limited to the preparation of very low molecular weight acrylate polymers, and predominantly to the preparation of volatile dimers, trimers, and tetramers. B. A. Feit, in European Polymer Journal 3,523 (1967), reported that he used these methods to prepare a mixture of alkoxyl-terminated and terminally unsaturated molecules shown by distillation to be dimers, trimers, and tetramers, and a small amount of non-distillables.

It has now been found that novel polymer compositions free of the undesirable properties of prior art materials can be prepared by an anionic polymerization technique which gives high yields of polymers having intermediate molecular weight, about 500 to 5,000, and which allows control of the polymer chain length and of the molecular weight distribution of the polymer. The importance of the molecular weight distribution is made clear when one considers the effect of the presence, in the mixture, of material significantly lower or significantly higher than the average in molecular weight. As indicated above, the low molecular weight ends, in the molecular weight region under consideration, tend to be volatile, thus giving rise to odor problems, problems in the formulation of end-use products in the face of a fugitive component, and ecological problems. The contamination of the atmosphere by volatile organic materials has become a much more pronounced problem in recent years, prompting restrictive legislation in many jurisdictions. Thus, it is important that polymers of the intermediate molecular weight of this invention not contain appreciable amounts of the volatile materials of just slightly lower molecular weights. Simultaneously, it is important that the intermediate molecular weight polymers not contain components with molecular weights appreciably higher than the average, because the high molecular weight components contribute disproportionately to certain properties such as the viscosity of the polymer. For many end uses, the ease of flow is a critical factor for the application of these intermediate molcular weight materials. Thus, it is of great significance to be able to prepare an intermediate molecular weight polymer which contains very little of either low molecular weight or high molecular weight components compared to the medium molecular weight of the system.

According to the invention, novel polymer compositions are provided which comprise an anionically-polymerized homopolymer of an ester of acrylic acid, or an anionically-polymerized copolymer of an ester of acrylic acid with at least one other copolymerizable monomer, preferably with at least one other copolymerizable ester of acrylic acid. In the polymer compositions of the invention, the homopolymer or copolymer has an average chain length, $\bar{n}$, of about 6 to 30 mers, and preferably of about 6 to about 20 mers. Generally, at least about 80% by weight of the homopolymer or copolymer will consist of molecules having chain lengths falling between about $\bar{n}/3$ and $3.3\bar{n}$, where $\bar{n}$ is the average chain length of the polymer. Thus, when the average chain length of the homopolymer or copolymer is about 6 to 7 mers, at least about 80% by weight of the homopolymer or copolymer will generally have chain lengths of about 2 to 20 mers, and when the average chain lengths of the homopolymer or copolymer is about 17 to 18 mers, at least about 80% by weight of the homopolymer or copolymer will generally have chain lengths of about 6 to about 60 mers. In the lower molecular weight polymers, and particularly those in which $\bar{n}$ is about 6 to 10, a narrower chain length distribution may be obtained in which at least about 80% by weight of the polymer will have chain lengths of about $\bar{n}/2$ to about $3\bar{n}$.

In a preferred embodiment of the invention, at least about 80% by weight of the homopolymer or copolymer consists of molecules with a chain length in the range of about 3 to 90 mers. Depending upon the particular ester of acrylic acid which is employed and the particular comonomer which may be employed, the polymer compositions of the invention will have a molecular weight distribution in the range of about 250 to about 10,000, and preferably about 300 to about 3000.

In the accompanying drawings, which will make the nature of the present invention more readily apparent, FIGS. 1 to 3 represent typical chain length distribution curves for polymers of the invention in which the molecular weight, as determined by calibrated gel permeation chromatography, is plotted against the percentage of each molecular weight fraction relative to the maximum molecular weight fraction. The average chain length, $\bar{n}$, is calculated by dividing the molecular weight at the distribution curve maximum by the molecular weight of the monomer. The vertical dotted lines within the distribution curve represent the determination of the 80% distribution limits. The 80% distribution limits have been determined to be the points at which the relative weight fraction is approximately 50% of the maximum weight fraction. The chain length, n, at each of these points is calculated by dividing the molecular weight at the points by the molecular weight of the monomer.

Figure 1:
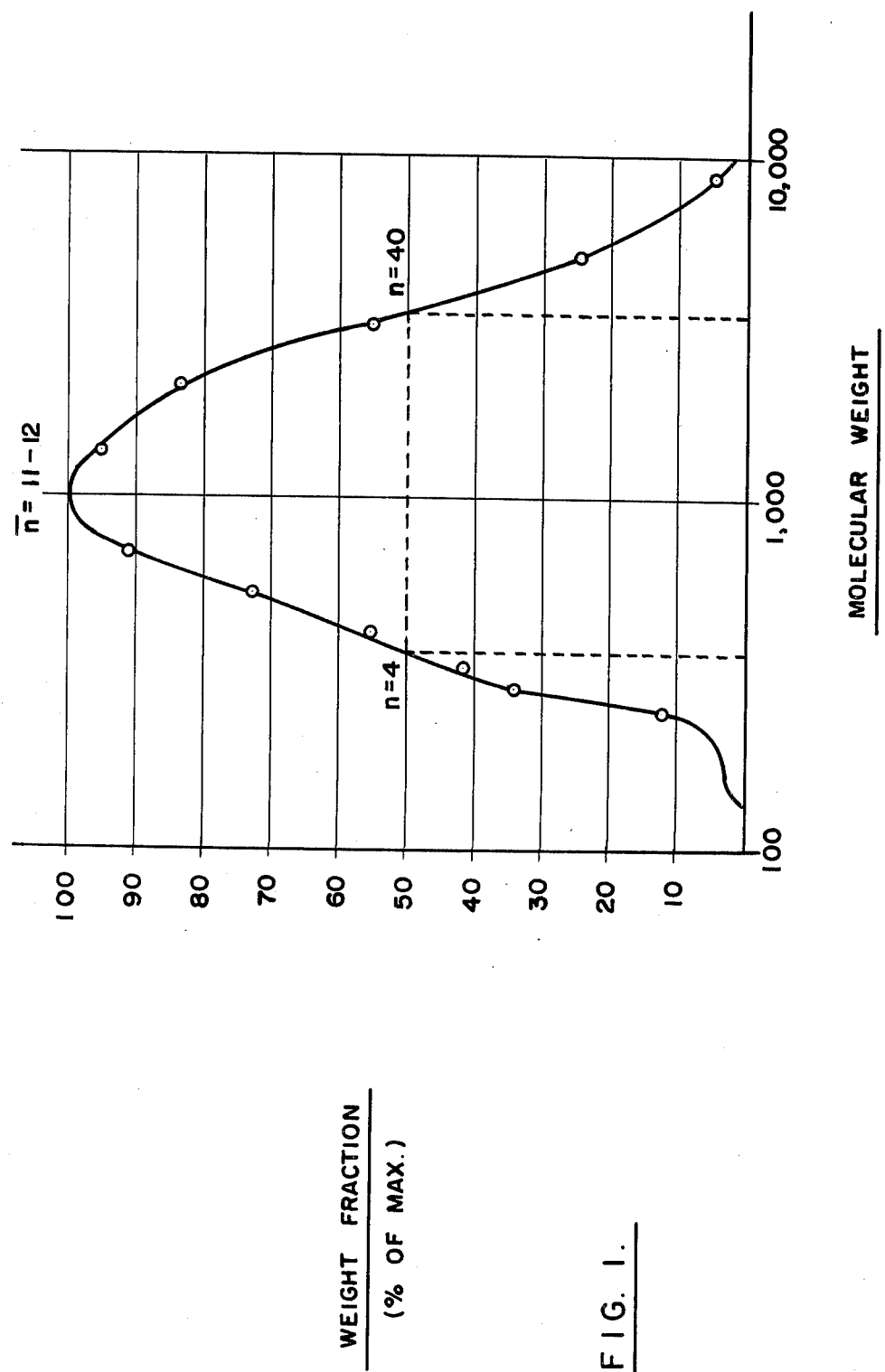
FIG. 1 represents the chain length distribution curve for the polymer of Example 2, in which the average chain length, $\bar{n}$, is 11 to 12 and 80% by weight of the polymer has a chain length of about 4 to 40.
Figure 2:
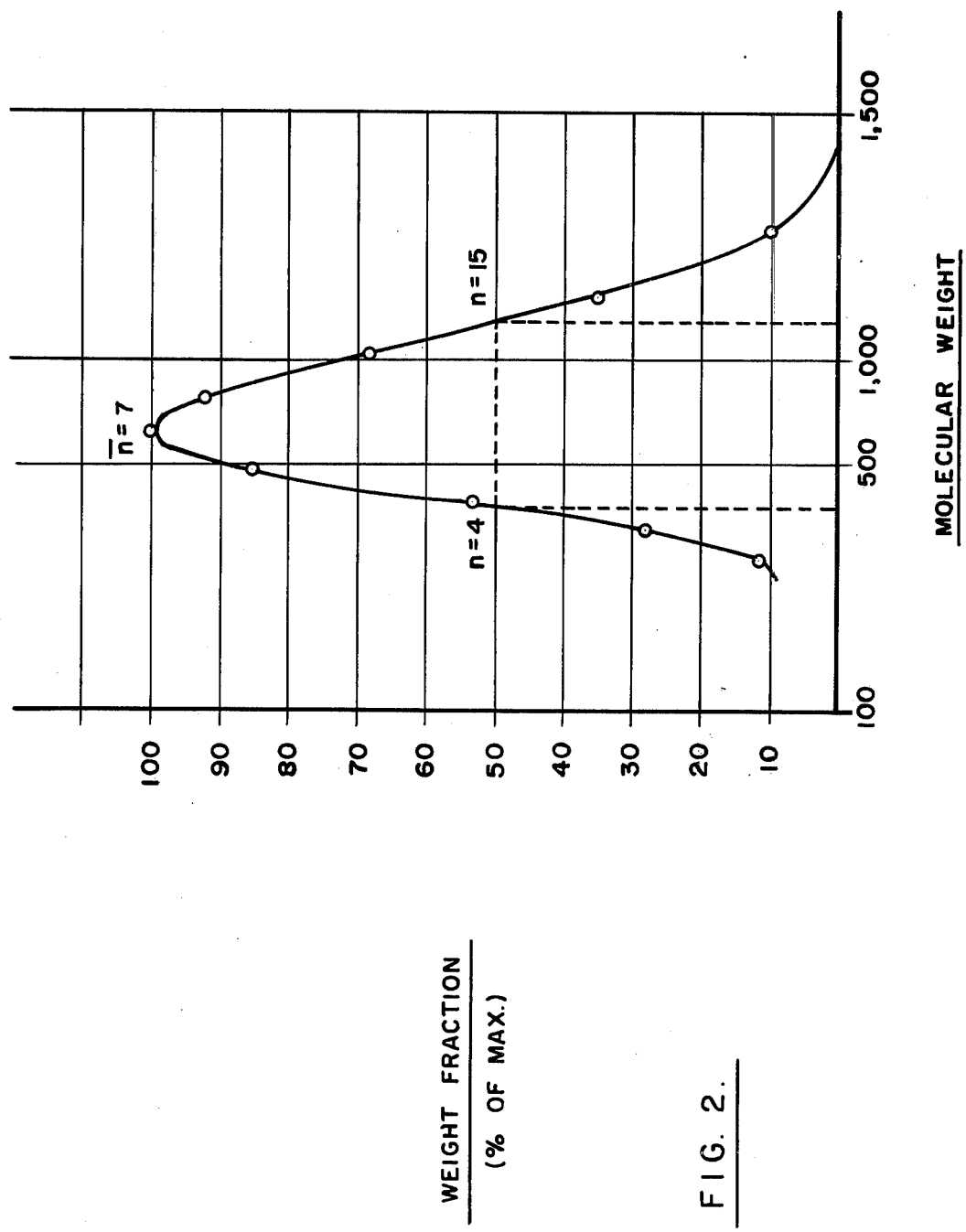
FIG. 2 represents the chain length distribution curve for the polymer of Example 9, in which the average chain length, $\bar{n}$, is 7 and 80% by weight of the polymer has a chain length of about 4 to 15.
Figure 3:
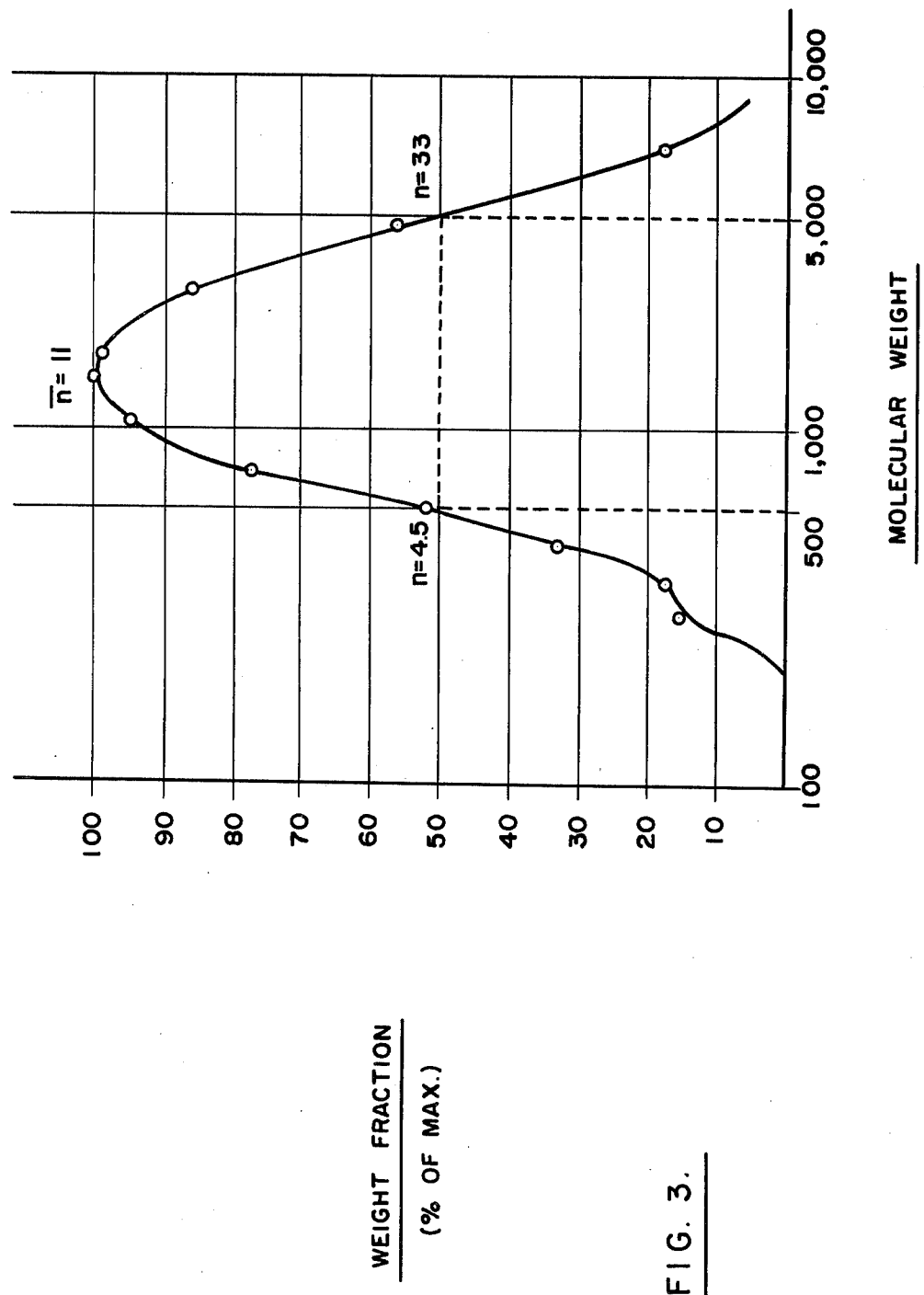
FIG. 3 represents the chain length distribution curve for the polymer of Example 16, in which the average chain length, $\bar{n}$, is 11 and 80% by weight of the polymer has a chain length of about 4.5 to 33.

The polymer compositions of the invention are produced by the anionic homopolymerization of an ester of acrylic acid, or by the anionic copolymerization of an ester of acrylic acid with at least one other copolymerizable monomer such as acrylonitrile or, preferably, another ester of acrylic acid. The anionic polymerization reaction is carried out in the presence of an alkoxide anion, which serves as a catalyst. Small amounts of an alcohol, which may serve as a chain-regulating agent, may also be present.

In general, most of the homopolymers of the invention can be represented by the following formula

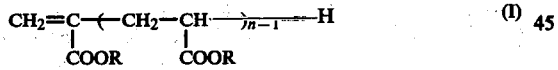

wherein

RO represents the alcohol group in the monomeric ester of acrylic acid, and n is an integer of 3 to 90, and preferably 3 to 50, and represents the chain length of the polymer.

The copolymers of the invention can be similarly represented, in general, by the following formula

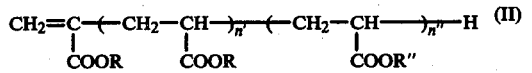

wherein

RO is as defined above,

R'O represents the alcohol group in the monomeric ester of the acrylate comonomer or comonomers, and n' and n" are integers of one or more, wherein the sum of n' and n" is 2 to 89, and preferably 2 to 49. The ratio of the two or more esters of acrylic acid which are the comonomers in preparing the copolymers of Formula II can be varied greatly to modify the properties of the resulting copolymer to give a copolymer having particularly desirble properties for the particular end use contemplated.

It should be noted that the copolymers represented by Formula II represent polymers of two or more monomers and are random copolymers, so that Formula II is only a simplified representation of the composition of these copolymers and does not attempt to show their physical stereochemical structure. Furthermore, it should be noted that if an alcohol is present as a chain-regulating agent in the reaction mixture, transesterification can occur to some extent during the polymerization reaction. Thus, in some of the homopolymers represented by Formula I and copolymers represented by Formula II, RO or R'O will be replaced at some positions by R"O, a group derived from the chain-regulating alcohol R"OH. When RO, R'O and R"O differ, scrambling of these groups by transesterification occurs to some extent during the polymerization reaction. Even in the absence of alcohol, when any RO (or R'O) groups of different kinds are present, scrambling occurs to some extent.

The novel polymers of this invention may be divided for convenience into four groups as follows:

I. Acrylic Esters With Relatively Unreactive Ester Groups

In addition to reaction via the terminal unsaturation on each molecule, the polymers in this group can be reacted by various well-known reactions, for example, through a transesterfication reaction, but in general fewer post-polymerization reactions are available than in the other groups.

II. Polymers Having Condensation-Crosslinkable Functionality

These polymers compositions are comprised of mer units which have condensation-crosslinkable functionality, other than the ester functionality, in the ester group or attached to the backbone, as in acid, amide and substituted amide groups as well as acid chloride or other acid halide groups. As used in the present specification and claims, the term "condensation-crosslinkable functionality" is intended to refer to functional groups which can react with or as a component of a crosslinking agent in conventional condensation reactions. Among the typical functional groups embraced by this term, which characterizes polymers of the invention, are hydroxy groups, hydroxyalkylamino groups, 1,3-oxazolidinyl groups, amino groups, alkylamino groups, arylamino groups, functional quaternized amino groups, alkylchlorohydrin groups, epoxyalkyl groups, isocyanate groups, anhydride groups, 1,3-dioxolanyl groups, aldimino groups, ketimino groups, and the like. In the polymers of the invention, the condensation-crosslinkable functionality is located on the portion of the acrylate ester normally derived from the esterifying alcohol. In a preferred embodiment of the invention, the polymers have an average of greater than about 2.5 crosslinkable groups per molecule, most preferably greater than about 3 crosslinkable groups per molecule, and about 15 to about 45 mole % of condensation-crosslinkable functionality.

III. Polymers Having Pendant Acrylate and Methacrylate Functionality

This group of polymers comprises the anionically-polymerized addition homopolymers or copolymers of esters of acrylic acid which have been post-reacted to provide polymers having pendant acrylate or methacrylate functionality.

IV. Polymers Having Allyl Functionality

These polymers comprise anionically-polymerized addition polymers of esters of acrylic acid having allyl functionality in one type of mer unit and at least one other type of mer unit.

A wide variety of esters of acrylic acid can be used in preparing the homopolymers and copolymers of the invention. Mixtures of these esters can also be used. For example, the copolymer may be that of at least one ($C_1$–$C_{24}$)alkyl acrylate and at least one copolymerized ethylenically-unsaturated ester of acrylic acid having condensation-crosslinkable functionality other than ester. In a preferred embodiment, the alkyl acrylate in the copolmyer is a ($C_1$–$C_4$)alkyl acrylate. Among the suitable esters which can be used are those having the formula

$$CH_2=CH-COOR \qquad (III)$$

wherein R is an alkyl group, preferably having 1 to 24 carbon atoms, most preferably 1 to 18 carbon atoms; an alkenyl group, preferably having 2 to 4 carbon atoms; an aminoalkyl group, preferably having 1 to 8 carbon atoms, and optionally substituted on the nitrogen atom with one or, preferably, two alkyl groups, preferably having 1 to 4 carbon atoms; an alkyl group, preferably having 1 to 4 carbon atoms, having a five- or six-membered heterocyclic ring as a substituent; an allyloxyalkyl group, preferably having up to 12 carbon atoms; an alkoxyalkyl group, preferably having a total of 2 to 12 carbon atoms; an aryloxyalkyl group, preferably having 7 to 12 carbon atoms; an aralkyl group, preferably having up to 10 carbon atoms; or a similar alkyl or aralkyl group having substituents which will not interfere with the anionic polymerization of the ester.

Expressed another way, homopolymers and copolymers of this invention include esters selected from the group consisting of ($C_1$–$C_{24}$)alkyl esters of acrylic acid, preferably a ($C_1$–$C_4$)alkyl acrylate, di($C_1$–$C_4$)alkylamino($C_2$–$C_4$)alkyl esters of acrylic acid, ($C_1$–$C_8$)alkoxyalkyl esters of acrylic acid, ($C_6$–$C_{10}$)aryloxyalkyl esters of acrylic acid, ($C_7$–$C_{10}$)aralkoxyalkyl esters of acrylic acid, and ($C_7$–$C_{10}$)aralkyl esters of acrylic acid. The copolymers of this invention include polymers in which more than one monomer is selected from a given group, for instance, the case where the polymer is a copolymer of at least two ($C_1$–$C_{24}$)alkyl acrylates. Other copolymers of the invention comprise monomers which may or may not be acrylates, such as copolymers of at least one ($C_1$–$C_{24}$)alkyl acrylate and at least one other copolymerizable ethylenically-unsaturated monomer. This copolymerizable monomer may be acrylonitrile or dimethylaminoethyl acrylate, preferably when the alkyl acrylate is a ($C_1$–$C_4$)alkyl acrylate.

Among the esters embraced by Formula III which are suitable monomers are unsubstituted alkyl acrylates, in which the alkyl group can have branched- or straight-chain, cyclic or acyclic spatial configurations, such as methyl acrylate, ethyl acrylate, propyl, isopropyl and cyclopropyl acrylates, isobutyl, t-butyl, n-butyl and cyclobutyl acrylates, pentyl and cyclopentyl acrylates, hexyl and cyclohexyl acrylates, heptyl and cycloheptyl acrylates, octyl, acrylates, including 2-ethylhexyl acrylate, nonyl acrylates, decyl acrylates, undecyl acrylates, lauryl acrylates, myristyl acrylates, cetyl acrylates, stearyl acrylates, and the like; aralkyl acrylates, such as phenylethyl acrylates, phenylpropyl acrylates, and the like; aralkyl acrylates, in which the aryl group is substituted with alkyl groups, halogen atoms, alkoxy groups, nitro groups, or similar substituents which will not interfere with the polymerization reaction; alkenyl acrylates, such as allyl acrylate, and the like; aminoalkyl acrylates, such as dimethylaminoethyl acrylate, phenylaminoethyl acrylate, t-butylaminoethyl acrylate, dimethylaminobutyl acrylates, diethylaminoethyl acrylate, and the like; alkyl acrylates having a heterocyclic group as a substituent on the alkyl group, such as morpholinoalkyl acrylates, oxazolidinylalkyl acrylates, piperidinodalkyl acrylates, dioxolanylalkyl acrylates, i.e., ketals and acetals of glyceryl acrylate, and the like; iminoalkyl acrylates, such as ketiminoalkyl acrylates and aldiminoalkyl acrylates; alkoxyalkyl, aryloxyalkyl, and aralkoxyalkyl acrylates, such as methoxyethyl acrylate, ethoxyethyl acrylate, butoxyethyl acrylates, hexyloxypropyl acrylates, ethoxypropyl acrylates, propoxybutyl acrylates, hexloxyhexyl acrylates, phenoxyethyl acrylates, benzyloxyethyl acrylates, and the like; and allyloxyalkyl acrylates, such as allyloxyethyl acrylate, allyloxyethoxyethyl acrylate, allyloxypropyl acrylate, and the like. Bis acrylate esters of diols, such as the diester of 1,4-butanediol and acrylic acid, can also be used. Other esters of acrylic acid which do not contain substituents which would interfere with the anionic polymerization of these esters are also suitable.

As noted above, the polymer compositions of the invention are produced by the anionic polymerization of the suitable monomer or monomers in the presence of an alkoxide catalyst.

The rate and degree of polymerization are influenced by several reaction variables, including the type and concentration of catalyst, the reaction temperature, and the presence or absence of alcohol. Under some reaction conditions, it may be advantageous to add with the monomers up to about 20 mole % of an alcohol, such as methyl alcohol, ethyl alcohol, propyl alcohol, or the like, which may serve as a chain-regulating agent. The addition of alcohol will generally give polymers having a shorter average chain length and a somewhat narrower chain length distribution.

It may be further advantageous under some conditions to use all of the monomer in the form of its monoalcohol adduct. The acrylic monomer is then generated in situ at relatively low concentrations during the polymerization by base-catalyzed thermal dissociation of the adduct and simultaneous removal of the alcohol at reduced pressure. The following reaction scheme (IV) shows this process:

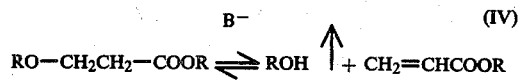

$$RO-CH_2CH_2-COOR \rightleftharpoons ROH \uparrow + CH_2=CHCOOR \qquad (IV)$$

In the polymerization process, which is generally used in making the polymers of the invention, the monomer is gradually added to a stirred suspension or solution of the alkoxide in an inert solvent. If an alcohol is used, the alcohol and the monomer can be gradually added together or separately to the polymerization mixture, or the alcohol can be added initially with the catalyst. At the conclusion of the addition of the monomer, the polymerization is completed during a final conversion period which may be as long as several hours. If desired, the alkoxide catalyst is then neutralized with a suitable acid, such as a mineral acid, as for example sulfuric acid, or a carboxylic acid, as for example acetic acid, and the resultant salt is removed by filtration or washed from the reaction mixture with water. If a solvent is present, it may be removed by conventional techniques, such as evaporation of distillation under reduced pressure.

The above polymerization reactions are generally run at a temperature of about 20° to about 125° C., and preferably about 40° to about 100° C. Since the polymerization reaction is exothermic, temperature control generally is maintained by either reflux or external cooling. Although no solvent is necessary to carry out these polymerization reactions, a suitable organic solvent which is inert under the reaction conditions, such as toluene, xylene, dimethylformamide, or the like, can be employed. It may be advantageous under some polymerization conditions to employ a solvent, for example, at about 10 to 20% by weight, in the later stages of the polymerization to maintain a viscosity which is more convenient for handling. The polymerization reaction is generally conducted at atmospheric pressure, although super- or subatmospheric pressures may be advantageous under some conditions.

The polymerizations of thhe invention are catalyzed by alkoxides. A wide variety of alkoxides can be used in the polymerizations of the invention, and generally any alkoxide derived from an alcohol having the formula ROH, where R is as defined in Formula III above, can be used. Mainly for economic reasons, simple alkoxides such as those with the counter ions potassium and sodium, and particularly sodium methoxide, potassium methoxide, and potassium t-butoxide are preferred as catalysts. Mixtures of alkoxides can also be used. However, by suitable choice of alkoxide, the rate of polymerization can be influenced greatly. The solubility of the alkoxide and the counter ion are factors which must be considered in assessing this influence. A polar organic cosolvent, such as, for example, dimethylformamide or dimethylsulfoxide, can be used advantageously under some reaction conditions to improve the solubility and consequently the efficiency of the catalyst. Generally, the alkoxide will be present in the reaction mixture at a concentration of about ½ to about 5 mole %, and preferably about 1 to about 4 mole % based on the total monomer charge. It has also been found that control of the molecular weight of the polymer is achieved mainly by regulating the concentration of catalyst used. Generally, as the catalyst concentration is decreased, the average chain length, $\bar{n}$, of the polymer is increased.

One of the advantages of the present invention is the ease with which acrylic polymers having varied or multiple functionality can be produced by copolymerization. Functional comonomers, such as allyl and allyloxyalkyl acrylates, aminoalkyl acrylates, alkoxyalkyl acrylates, oxazolidinylalkyl acrylates, ketimino acrylates, and the like, can be copolymerized without effecting the non-acrylic functionality. For example, acrylates containing allyl substituents are selectively polymerized through the acrylate unsaturation without affecting the allyl unsaturation, quite unlike the nonselectivity of typical free-radical polymerizations of allyl acrylates.

Another method for introducing functionality into the polymers of the invention involves hydrolysis of the ester groups in the polymer to carboxylic acid groups. Using conventional saponification procedures, it has been found that hydrolysis of the polymers of the invention under alkaline conditions proceeds relatively rapidly, and up to about 90 to 95% of the ester groups can be converted to carboxylic acid groups with mild heating at less than about 100° C.

Since the polymerization processes of the invention are not suitable for the direct preparation of acidic polymers by homo- or copolymerization of acrylic acid, the hydrolysis products are of particular usefulness and importance. These acids, both in their free acid and salt form, are useful as plasticizers, hot melt coatings, adhesives, leveling agents, coalescent aids, and dispersants.

When these acids are formulated with reactive crosslinking agents, such as epoxides, nitrogen resins, including melamines, ureas, and guanidines, isocyanates, hydroxyl-contining polymers, polyols, polamines, hydroxyalkylaimides, phenolic resins, including phenol-formaldehyde condensates, and similar coreactive functional materials, reactive systems are formed which may be formulated and cured by conventional means and which have a wide variety of use applications, including the preparation of coatings, adhesives, films, fibers, powder coatings, caulks, sealants, binders for nonwoven materials, molded plastics, and the like.

Any of the conventional epoxides, including those described above, nitrogen resins, including those described above, isocyanates, polyhydroxyl-containing polymers, including the hydroxyl-containing polymers of the invention, polyols, polyamines, polyfunctional hydroxyalkylamides including the polyfunctional hydroxyalkylamides of the present invention, and phenolic resins, and related crosslinking and coreactive materials commonly used in carboxyl-reactive systems can be used with the carboxylic-containing polymers of the invention. Generally, the carboxyl-containing polymers and the coreactive materials will be combined in the same ratios as in the corresponding carboxyl-reactive systems of the art, with a weight ratio of carboxyl-containing polymer to coreactive material(s) of about 99:1 to about 1:99, and preferably of about 95:5 to about 5:95.

These acids are also useful as intermediates, representing a convenient source, by means of reaction with ethylene oxide or propylene oxide, of polyhydroxyalkyl esters, which are useful in the preparation of urethanes annd isocyanate prepolymers, by means of reaction with dihydroxy alcohols, of polyesters, which are useful in making fibers, coatings, and films, and by means of reaction with epichlorohydrin, of aliphatic polyepoxides, which are useful in coatings and other plastics applications. Polyalkylene oxide and sulfonato ethyl derivatives of the acids, useful in surfactant applications, can also be made.

These polycarboxylic acids can also be readily converted to the corresponding acid chlorides by treatment with known halogenating agents. Such acid chlorides are useful as intermediates in preparing derivatives of the acids, such as amides and substituted amides, and functional esters including dimethylaminoethyl, t-butylaminoethyl, 2-oxazolidinylethyl, polyethoxy, sulfonatoethyl, trimethylammoniumethyl, and similar functional esters. The acid chlorides are also useful in the preparation of various polymers, for use as fibers, coatings, films, and the like.

Another useful derivative of fthe polycarboxylic acids of this invention is obtained by heating the polymers to a temperature of about 160° to about 220° C. This produces a cleavage of water and/or alcohol and the generation of anhydrides which, depending on the actual times and temperatures employed, will vary from simple low anhydride functionality to high levels of polyanhydride and even anhydride-crosslinked high molecular weight systems, some of which may be gels. The conversion to the anhydrides generally raises the decomposition temperature of the polymer and increases the polymer terminal group stability. The anhydrides are useful as coatings intermediates, adhesives, water-sensitive films and the like, as well as intermediates in making a wide range of other polymers.

Other derivatives of the polymers of the invention can be conveniently made by post-reaction of the ester, such as by transesterification, saponification, neutralization, amidation, and the like, using techniques well-known in the polymer art. Transesterification with functional alcohols, such as allyl and allyloxyalkyl alcohols, dimethylaminoethanol, t-butylaminoethanol, N-hydroxyethyloxazolidine, alkyloxyethanol, ethoxyethanol, and the like, and with diols, such as ethylene, propylene, and butylene glycols, provides a particularly useful access to polymers containing desirable functional groups.

The polymers of this invention comprise mers having condensation-crosslinkable functionality such that the polymers correspond to the formula

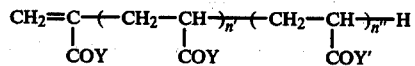

wherein Y and Y' are individually halogen, amino, $(C_1-C_4)$alkylamino, hydroxy$(C_1-C_4)$alkylamino, bishydroxy$(C_1-C_4)$alkylamino, $(C_1-C_4)$alkoxy$(C_1-C_4)$alkylamino, bis$(C_1-C_4)$alkoxy$(C_1-C_4)$alkylamino, or OR; wherein R is hydrogen, $(C_1-C_8)$aminoalkyl, $(C_1-C_4)$alkylamino$(C_1-C_8)$alkyl, $(C_2-C_8)$isocyanatoalkyl, $(C_2-C_8)$hydroxyalkyl, 1,3-oxazolidin-3-yl$(C_2-C_4)$alkyl, such as 1,3-oxazolidinylethyl, optionally having up to two $(C_1-C_4)$alkyl substituents on the oxazolidinyl ring, such as 2 alkyl-1,3-oxazolidinylethyl, $(C_1-C_8)$aldimino$(C_2-C_6)$alkyl, $(C_1-C_8)$aldimino$(C_2-C_6)$alkoxyalkyl, the aldimino structures optionally containing halogen, $(C_3-C_{13})$ketimino$(C_2-C_6$alkyl, $(C_3-C_{13})$ketimino$(C_2-C_6)$alkoxylakyl, 1,3-dioxolan-4-yl$(C_2-C_4)$alkyl, optionally having up to two two $(C_1-C_8)$hydrocarbon substituents on the dioxolanyl ring, epoxy$(C_2-C_4)$alkyl di$(C_1-C_4)$alkyl ammonium $(C_2-C_4)$alkyl, $(C_2-C_8)$epoxy alkyl, 3-chloro-2-hydroxypropyldimethylammoniummethyl, 3-chloro-2-hydroxypropyl, or sodium, potassium, or ammonium cation; and
wherein n' and n" are integers of 0 to 89, wherein the sum of n' and n" is 2 to 89.

The polymers of this invention comprise mers with relatively unreactive ester groups such that the polymers correspond to the formula

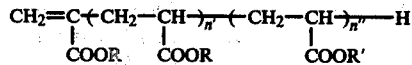

wherein R and R' are individually $(C_1-C_{24})$alkyl, di$(C_1-C_4)$alkylamino$(C_1-C_8)$alkyl, $(C_2-C_{12})$alkoxyalkyl, $(C_7-C_{12})$aryloxyalkyl, $(C_9-C_{14})$aralkyloxyalkyl, or $(C_7-C_{10})$aralkyl.

This invention also includes polymers of at least one ester of acrylic acid wherein the polymer comprises mers having the formula

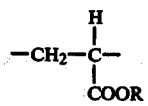

wherein R is acryloyloxyalkyl or methacryloyloxyalkyl having up to 4 carbon atoms in the alkyl porton, and wherein $\bar{n}$, the average chain length of the polymer, is about 6 to 30 mers, and at least about 80% by weight of the molecules of the polymer having chain lengths of about $\bar{n}/3$ to about $3.3\bar{n}$ mers. Additionally, these polymers may also comprise mers having the formula

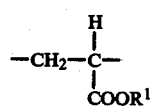

wherein $R^1$ is $(C_1-C_{24})$alkyl, preferably $(C_1-C_4)$alkyl.

This invention also includes polymers of at least one ester of acrylic acid wherein the polymer comprises mers having the formula

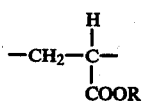

wherein R is $(C_2-C_4)$alkenyl, allyloxyalkyl having up to 12 carbon atoms, or allyloxyalkoxyalkyl having up to 15 carbon atoms, and
wherein $\bar{n}$, the average chain length of the polymer, is about 6 to 30 mers, and at least about 80% by weight of the molecules of the polymer have chain lengths of about $\bar{n}/3$ to about $3.3\bar{n}$ mers. Preferably, R is allyl or allyloxyethyl, and the polymer also may comprise mers having the formula

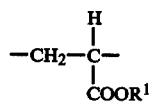

wherein $R^1$ is $(C_1-C_{24})$alkyl, preferably $(C_1-C_4)$alkyl.

Hydroxyl functionality is generally introduced into the polymers of the invention by post-reacting a polymer of the invention, such as by transesterifying the ester groups with a polyhydroxy alcohol or esterifying a carboxyl-functonal polymer prepared as described below, with a polyhydroxy alcohol. Polymers of the invention having hydroxyl functionality can also be prepared by using a monomer having hydroxyl functionality, such as hydroxyethyl methacrylate, hydroxypropyl methacrylate, or the like, or by carrying out the polymerization reaction in the presence of a polyhydroxy alcohol, such as ethylene glycol, propylene glycol, or the like.

Polymers of the invention having hydroxyl functionality can be combined with aminoplast nitrogen resins, including melamines, ureas, and guanidines, phenolic resins, including phenol-formaldehyde condensates, carboxyl-containing polymers, isocyanates, polyesters, polyfunctional acids, polyanhydrides, epoxides, and similar coreactive functional materials, to form reactive systems which can be formulated and cured by conventional means and which have a wide variety of use applications, including the preparation of coatings, adhesives, films, fibers, powder coatings, caulks, sealants, binders for non-woven materials, molded plastics, and the like. Any of the conventional nitrogen resins, phenolic resins, carboxyl-containing polymers including the carboxyl-containing polymers of the invention, polyesters, polycarboxylic acids, polyanhydrides, isocyanates, epoxides, and related crosslinking and coreactive materials commonly used in hydroxyl-reactive systems can be used with the hydroxyl-containing polymers of the invention. Generally, the hydroxyl-containing polymers and the coreactive materials will be combined in the same ratios as in the corresponding hydroxyl-reactive systems of the art, with a weight ratio of hydroxyl-containing polymer to coreactive material(s) of about 99:1 to about 1:99, and preferably of about 95:5 to about 5:95.

Among the epoxides which can be formulated and reacted with hydroxyl-containing polymers of the invention are the polyepoxide reaction products of epichlorohydrin with polyhydroxy phenols and with aliphatic polyols, the cycloaliphatic epoxides derived from various cycloalkenes, and the various ethoxyline resins available under the tradenames of Epon or Araldite. See, for example, U.S. Pat. No. 3,533,985, of Lantz et al., granted Oct. 13, 1970. Suitable polyols from which polyepoxides can be prepared include ethylene glycol, propylene glycol, glycerol, trimethylol ethane, trimethylol propane, sorbitol, pentaerythritol, dipentaerythritol, tripentaerythritol, neopentylglycol, β-methylglycerol, diglycerol, polyethylene glycol, polypropylene glycol, and addition products of the described polyols with either ethylene oxide or propylene oxide or mixtures of ethylene oxide and propylene oxide. Cyckloaliphatic epoxides include epoxyethyl-3,4-epoxycyclohexane (vinyl-cyclohexene diepoxide), limonene diepoxide, dicyclopentadiene diepoxide, bis(3,4-epoxycyclohexylmethyl)adipate, (3',4'-epoxycyclohexylmethyl)-3,4-epoxycyclohexane carboxylate, (3'4'-epoxy-6'-methylcyclohexylmethyl)-3,4-epoxy-6-methylcyclohexane carboxylate, 3-(3',4'-epoxycyclohexykl)-2,4-dioxaspiro(5.5)-8,9-epoxyundecane, 3-(glycidyloxyethoxyethyl)-2,4-dioxaspiro(5.5)-8,9-epoxyundecane and 3,9-bis(3',4'-epoxycyclohexyl)-spirobi(-metal-dioxane). Such epoxides are well-known and either commercially available or preparable by conventional means.

Among the nitrogen resins which can be formulated and reacted with hydroxyl-containing polymers of the invention are the reaction products of formaldehyde with urea, thiourea, biuret, N,N-ethyleneurea, N,N'-ethyleneurea, N,N'-dimethylurea, N,N'-diethylurea, N,N'-dimethoxymethylurea, N,N'-dimethoxyethylurea, N,N'-diethoxyethylurea, tetramethoxymethylurea, tetraethoxyethylurea, and dicyandiamide, acetoguanamine, benzoguanamine, formoguanamine, N-(t-butyl)-melamine, N-(t-octyl)melamine, ammeline, 2-chloro-4,6-diamino-1,3,5-triazine, 2-phenyl-p-oxy-4,6-diamino-1,3,5-triazine, 6-methyl-2,4-diamino-1,3,5-triazine, 2,4,6-trihydrazine-1,3,5-triazine, 2,4,6-triethyltriamino-1,3,5-triazine and the N,N-dimethylmelamines, as well as their alkylated derivatives, obtained by treating the formaldehyde condensate with an alkanol or cycloalkanol, preferably having 1 to 6 carbon atoms.

Polymers of the invention having oxazolidinyl functionality are obtained by using a monomer having oxazolidinyl functionality, including those described in U.S. Pat. NO. 3,037,006, of Hankins et al., granted May 29, 1962, such as oxazolidinylethyl acrylate, by carrying out the polymerization reaction in the presence of an alcohol having oxazolidinyl functionality, such as 3-hydroxyethyl-1,3-oxazolidine, 2-isopropyl-3-hydroxyethyl-1,3-oxazolidine, or the like, or by post-reacting an ester polymer of the invention by transesterification with an alcohol having oxazolidinyl functionality. In one embodiment of the invention, the oxazolidine level of the polymer will be about 10 to about 35% by weight, and preferably about 20 to about 30% by weight (calculated as percent by weight of 2-(2-alkyl-N-oxazolidinyl)ethyl acrylate. However, polymers havng greater or lesser oxazolidine levels can also be prepared and used as described below. These polymers which contain oxazolidinyl functionality when formulated with polyisocyanates, including isocyanate-terminated prepolymers, are especially useful in moisture-curable systems, such as those described in U.S. Pat. application Ser. No. 7,270, filed on January 30, 1970, by W. D. Emmons, now U.S. Pat. No. 743,626, issued July 3, 1973 and incorporated herein by reference. In general, the ratio of molar equivalents of isocyanate to oxazolidine in the moisture-curable systems will be from about 1:10 to about 100:1 and preferably from about 1:1.1 to about 2.5:1. The moisture-curable systems are useful in forming coatings, adhesives, films, caulks, sealants, binders for non-woven fabrics, and the like.

Additional unsaturation can be introduced into the polymers of the invention by using a monomer having allyl functionality, such as allyl acrylate, allyloxyethyl acrylate, or the like, by carrying out the polymerization reaction in the presence of an alcohol having unsaturation, such as allyl alcohol, allyloxyethanol, or the like, or by post-reacting a polymer of the invention by transesterification with an alcohol having unsaturation, by esterification of an acid-containing polymer of the invention with a glycidyl acrylate or methacrylate, or similar ester of acrylic or methacrylic cid, by reacting a polymer of the invention having glycidyl functionality with acrylic or methacrylic acid, using a quaternary ammonium catalyst, or by reacting a polymer of the invention having hydroxyl functionality with a lower alkyl ester of acrylic or methacrylic acid, using a strong acid catalyst. These polymers which contain unsaturation can be cured by conventional thermal means or by actinic, ultraviolet, or electron beam radiation, in the presence of a suitable initiator, such a benzoin methyl ether, diphenyldisulfide, benzophenone, triphenylphosphine, or the like. The radiation curable coatings are especially adaptable for formulating fast-drying printing inks, wood coatings, can coatings, and the like.

Among the preferred polymers of the invention having pendant unsaturation are homopolymers of allyl acrylate and copolymer of allyl acrylate with ($C_1$–$C_4$)-alkyl acrylates, prepared by the procedures of Example 1, and having a weight average molecular weight of about 600 to about 2000, and the reaction products of the bis-, tris-, and higher acid-containing polymers of the invention, with glycidyl acrylate or glycidyl methacrylate, having a weight average molecular weight of about 700 to 2500.

Polymers of the invention having hydroxyalkylamide functionality are obtained by post-reacting an ester polymer of the invention with an alkanolamine, a dialkanolamine, or an alkylalkanolamine, generally using a basic catalyst such as an alkali metal alkoxide. Hydroxyalkylamide functionality can also be obtained by reacting the acid and acid chloride polymers of the invention, which are described below, with a suitable hydroxyamine.

The polymer compositions of the invention have a wide variety of uses. As described above, they are particularly useful as intermediates in preparing functionally-modified polymer compositions. They are also quite useful in forming films, coatings, such as in paints, lacquers, varnishes, and the like, impregnants, and adhesives for both natural and synthetic materials, such as paper, textiles, wood, plastics, metal, and leather, as binders for non-woven fabrics, as plasticizers and modifiers for a wide variety of polymer compositions, as melting point depressants, as leveling agents and coalescent aids, and in a wide variety of other uses. Since the polymers of the invention themselves are polymerizable unsaturated compounds. They can also be used as monomers for preparing a wide variety of higher molecular weight solution and emulsion copolymers. Thus, polymers can be produced which are the product of the free-radical polymerization of a polymer of this invention with an ethylenicaly-unsaturated monomer. They can also be used as non-volatile comonomers in monomer/polymer syrups. Such compositions, as well as polymers containing additional unsaturation such as allyl and allyloxy-containing polymers, can be cured by any suitable technique, including heating or ultraviolet irradiation. Pigments, dyes, photosensitizers, free-radical initiators, flow control agents, or other optional ingredients can also be included in the polymer compositions of the invention.

When used as coatings, fillers, or adhesives, the polymer compositions of the invention can be applied with or without a solvent by casting permanently or removably onto a suitable substrate. However, one of the advantages of the present invention is that reactive polymers can be prepared which can be applied as air-, moisture-, thermally-, or irradiatively-cured coatings, fillers or adhesives without the use of any solvents, in either solid or liquid form as 100% solids compositions. This is particularly desirable since elimination of volatile solvents also eliminates potential ecological hazards. Coatings compositions comprising a polymer of this invention, 0 to about 50% of a carrier, such as water or an organic solvent, and optionally comprising a pigment, are very useful.

The following examples will further illustrate the invention but are not intended to limit it in any way. All parts are by weight and all temperatures are in degrees Centigrade, unless otherwise noted.

EXAMPLE 1

Polymerization of Methyl Acrylate

This example describes a typical preparation of an ester of acrylic acid by an anionic polymerization process of the invention.

A. To a dry, three-neck flask equipped with mechanical paddle stirrer, thermometer, addition funnel, and reflux condenser under dry nitrogen, is charged 5 mole % (based on total monomer) sodium methoxide (25 weight % solution in methanol). With good stirring, methyl acrylate (MA) monomer is added dropwise over a ½ to ¾-hour period, maintaining the temperature at about 70° to 75° C. with cooling. The mixture acquires a slight increases in viscosity after the methanol initially present is consumed in mono-Michael adduct formation, and exotherm is observed during 70 to 80% addition of monomer. External heat is then applied to maintain the temperature of about 70° to 75° C. Analysis of the mixture by gas liquid chromatography (glc) ¾-hour after addition is complete discloses less than 2% of the monomeric MA to be present and progressively increasing fractions of longer eluting components. The slightly hazy, yellow-orange oil is cooled to about 40° to 50° C., quenched with 5 mole % acetic acid, removing almost all color, and either washed with water or filtered by aspirator. Although filtration is effective in removing neutralized salts, it proceeds slowly due to the thixotropic nature of the salt/polymeric MA combination. Aqueous wash and separation of the toluene-diluted product is the preferred method for removing neutralized catalyst. Toluene azeotroping of the separated layers results in a dry, homogeneous solution of the product in a greater than 90% yield. Stripping the product under vacuum (to less than 5 mm Hg at 100° C.) removes residual solvent, mono-adduct, and dimer to leave a clear, pale yellow oil having a viscosity of 300 cps at 25° C. Gel permeation chromatograhy shows a peak maximum at 520 ($\bar{n} \sim 6$), with more than 80% by weight distributed between 220 and 1200 ($n \sim 2.6$–14); ebulliometry indicates an $\overline{M}n$ of about 500. Infrared and nuclear magnetic resonance spectrometry confirm the presence of unsaturation; double bond values determined by mercuric ion-catalyzed brominations are 2.0–2.1 meq/g (equivalent weight about 500).

B. Procedures identical with those of (A) except for the substitution of sodium methoxide in methanol by the following catalysts:

(1) Potassium t-butoxide, neat or as a slurry in toluene, xylene, or the like
(2) Potassium methoxide as a slurry in toluene, xylene, or the like
(3) Potassium methoxide solution in dimethylformamide at 35° C.
(4) Potassium t-butoxide slution in dimethylformamide at 35° C.

result in polymers of similar appearance, somewhat higher averge molecular weight and viscosity, and lower double bond values consistent with their higher average molecular weight.

C. Analogous polymerization behavior results with the following acrylate monomers: ethyl acrylate, isopropyl acrylate, butyl acrylate, 2-ethylhexyl acrylate, isobutyl acrylate, t-butyl acrylate, and allyl acrylate. Copolymerization proceeds smoothly with 1:1 mixtures of methyl acrylate/ethyl acrylate, methyl acrylate/isobutyl acrylate, methyl acrylate/allyl acrylate, and the like, employing the basic polymerization procedure above.

EXAMPLES 2 to 22

Following the procedures of Example 1, a wide variety of acrylate homopolymers and copolymers are prepared. Table I summarizes the polymerization conditions and properties of some typical acrylate polymers of the invention.

TABLE I

ACRYLATE HOMO - AND COPOLYMERS[1]

| Example | Monomer(s)[2] | Catalyst | Catalyst Concentration[3] | Methanol Concentration[3] | Hours to 95% Conversion Following (Addition Time) | | Average Chain Length[4] (80% Distribution) | |
|---|---|---|---|---|---|---|---|---|
| 2  | MA          | KOtBu | 4% | 0   | 1   | (0.7) | 11–12 | (4–40) |
| 3  | MA          | KOtBu | 4% | 4%  | 2   | (0.7) | 10–11 | (4–27) |
| 4  | MA          | KOtBu | 4% | 8%  | 3   | (0.7) | 8–9   | (4–23) |
| 5  | MA          | KOtBu | 4% | 20% | 4.5 | (0.7) | 7     | (3.5–12) |
| 6  | MA          | KOtBu | 3% | 0   | 7   | (2.0) | 16    | (6–51) |
| 7  | MA          | KOtBu | 2% | 0   | 16  | (2.3) | 18    | (6–58) |
| 8  | MA          | KOMe  | 4% | 0   | 4   | (1.0) | 11–12 | (5–40) |
| 9  | MA          | NaOMe | 4% | 20% | 6   | (1.0) | 7     | (4–15) |
| 10 | MA          | NaOMe | 4% | 0   | 20  | (1.3) | 11–12 | (5–42) |
| 11 | MA          | NaOMe | 2% | 10% | 4   | (1.0) | 12–13 | (4.5–33) |
| 12 | MA/EA (1:1) | KOtBu | 4% | 0   | 2   | (1.5) | 9     | (4–32) |
| 13 | MA/i-BA (1:1) | KOtBu | 4% | 0 | 4   | (2.3) | 13    | (5–37) |
| 14 | EA          | KOtBu | 4% | 0   | 3   | (1.0) | 8–9   | (4–25) |
| 15 | i-PA        | KOtBu | 4% | 0   | 4   | (1.0) | 14–15 | (4.5–44) |
| 16 | BA          | KOtBu | 4% | 0   | 4   | (3.0) | 11    | (4.5–33) |
| 17 | BA          | KOtBu | 2% | 0   | 6   | (3.4) | 15    | (5–50) |
| 18 | BA          | KOtBu | 1% | 0   | 24  | (3.7) | 25    | (8–100) |
| 19 | t-BA        | KOtBu | 4% | 0   | 2   | (0.7) | 35    | (10–100) |
| 20 | AlA         | KOtBu | 4% | 0   | 3   | (0.7) | 11–12 | (4–40) |
| 21 | AlA/MA (1:1)| KOtBu | 4% | 0   | 2   | (0.7) | 12    | (4–40) |
| 22 | EHA         | KOtBu | 4% | 0   | 4   | (0.7) |       |        |

[1]Reaction temperature 70 ± 3° C.
[2]The following abbreviations are used: MA = methyl acrylate; EA = ethyl acrylate; i-BA = isobutyl acrylate; BA = butyl acrylate; i-PA = isopropyl acrylate; t-BA = t-butyl acrylate; AlA = allyl acrylate. Comonomer molar ratios in parentheses.
[3]Mole % based on total monomer.
[4]Represents approximate average chain length ($\bar{n}$) determined from the maximum weight fraction via standardized gel permeation chromatography (based on methyl methacrylate oligomer calibration). The distribution of 80 ± 2% of total polymer weight is given in terms of monomers.

EXAMPLES 23 TO 25

Preparation of Polycarboxylic Acids and Salts

EXAMPLE 23

The polycarboxylic acid salt, and acid, of the butyl acrylate polymer of Example 16 are prepared at the 10–30 equivalent percent level (on contained ester). An example at 18% is described below.

A solution of butyl acrylate polymer, as prepared in Example 16, (115 g, 89% solids in toluene) in 50 g methanol is treated at room temperature with 17.7 g of 45% by weight aqueous potassium hydroxide (0.144 mole, 18 eq. %). Following the one hour addition at 30° C., titration of an aliquot of the clear orange-yellow solution shows that conversion is about 94% based on the caustic added. The solution is warmed to reflux for 1 hour and gives essentially 100% conversion. Additional reflux (5 hrs.) gives no increase in carboxylate content. Water is added to reduce solids content to 50–60%, and methanol, butanol, and toluene are removed via azeotrope. The product mixture, returned to 60% solids with water and free of methanol, butanol, and toluene, is a clear yellow solution of the potassium salt of butyl acrylate in water.

The poly-acid ester is isolated by neutralization of the salt solution with aqueous hydrochloric acid (5% excess) and extraction with an equal weight of toluene. Separation of the layers, azeotropic drying of the toluene solution, and subsequent titration discloses 91–92 equivalent % of the polymeric acid content recovered in toluene and <9 equivalent % lost as water-soluble acids to the aqueous separated layer.

EXAMPLE 24

Low molecular weight acrylate polymers as their poly-acid salts at conversion levels up to about 90 equivalent % of contained ester are conveniently obtained with increased caustic levels.

Typically, the methyl acrylate polymer of Example 2, or the butyl acrylate of Example 16, are treated with 100 equivalent percent (on contained ester) of aqueous caustic and taken to gentle reflux for several hours on the steam bath. After distillation of the alcohol and toluene, the products remain as clear aqueous solutions of poly-carboxylate salts at 87% (methyl acrylate) and 89% (butyl acrylate) conversions.

EXAMPLE 25

Strong acid-catalyzed hydroylses of low molecular weight acrylate polymers proceed smoothly in aqueous media at moderate temperature (less than 100° C.). Distillation of alcohol co-product from the reaction mixture as it is formed is necessary. Prolonged reflux and alcohol distillations from less than 5 mole % $H_2SO_4$-catalyzed hydrolyses yield products containing carboxylic acid contents which increase with reaction time.

Typically, 110 g of the methyl acrylate polymer of Example 2 (85% by weight in toluene) is treated with 2.0 g 98% $H_2SO_4$ and 90 g $H_2O$. Toluene is removed by reverse azeotrope at 90° C., during which time 12 equivalent % acid is formed. The two-phase system is partially homogenized with 100 g 1,2-dimethoxyethane and returned to slow reflux. Methanol and co-solvents are distilled via an efficient column and result in the following acid conversions with time.

| Acid Formed (% of Ester Content) | Time at Reflux (Hrs.; 1 Atm.) |
|---|---|
| 12% | (toluene azeotrope, less than one hour) |
| 21 | 1 |
| 37 | 4.5 |
| 52 | 7 |
| Recharged water lost by distillation. | |
| 61 | 8 |
| 77 | 10.7 | butyl acrylate polymers of the invention by the transesterification procedures described above.

TABLE II
LOW MOLECULAR WEIGHT POLYOLS VIA TRANSESTERIFICATION WITH ALCOHOLS AND GLYCOLS

| Example No. | Polymer of Example No. | $\overline{M}n^1$ | Alcohol Charge per Ester eq.[2] | Catalyst (% of oligomer) | | Product OH No. | Product Acid No. | Product $\overline{M}n^1$ | Functionality[3] |
|---|---|---|---|---|---|---|---|---|---|
| 26 | 2 | 628 | 1.2 | (1,3BG)[4] | NaOMe (3.6) | 219 | 5 | 950 | 4.0 |
| 27 | 2 | 628 | 0.7 | (allyl alcohol) | NaOMe (2.7) | 83 (Br No.) | 6.4 | 646 | 3.3 |
| 28 | 2 | 628 | 0.46 | (HEOX)[4] | NaOMe (3.0) | NA | <2 | 751 | 1.5 |
| 29 | 2 | 667 | 1.0 | (allyl alcohol) | NaOMe (4.8) | 78 (Br No.) | 7.1 | 793 | 3.8 |
| 30 | 13 | 695 | 0.64 | (1,3BG)[4] | KOtBu (4.0) | 147 | 10 | 1465 | 4.2 |
| 31 | 14 | 1055 | 1.0 | (1,3BG)[4] | NaOMe (2.1) | 159 | 2.5 | 1360 | 4.2 |
| 32 | 14 | 1055 | 1.7 | (1,3BG)[4] | NaOMe (3.2) | 223 | 4.2 | 1590 | 6.9 |
| 33 | 13 | 750 | 1.6 | (1,3BG)[4] | NaOMe (3.3) | 190 | 3.5 | 827 | 3.1 |

[1] Ebulliometrically determined on stripped sample.
[2] Ester equivalent: weight of stripped oligomer/monomer molecular weight.
[3] Functionality: [Hydroxyl No. (or Bromine No.) × 1.1 × Product $\overline{M}n$]/56,100.
[4] Alcohols: HEOX = 2-(3-oxazolidinyl)ethanol; 1,3BG = 1,3 butylene glycol.

The product is a clear, pale yellow-orange oil which contains 78–80 equivalent % acid at 70% solids content in water.

EXAMPLES 26 TO 33

Preparation of Polyols

These examples describe the preparation of polyols from the transesterification of polymers of the invention with alcohols and glycols. The following general procedure is employed:

The polymer, prepared as described in Examples 1–22, is stripped of solvent in vacuo, generally at a maximum temperature of 120° C., and minimum pressure of 3 mm Hg. A dry nitrogen sparge of about 50 cc/min. is employed throughout the strip until the final 15 minutes, during which time it is increased to about 800 cc/min.

The glycol or alcohol and catalyst are charged, and heating is begun with a nitrogen sparge of about 50 to 100 cc/min. Distillates are trapped to 0° C. and −78° C. For runs with the butyl acrylate polymer, the reaction is conducted at 50 mm Hg to facilitate removal of butanol. Temperature is raised over a period of several hours to about 120° to 200° C. and maintained until the desired amount of distillate is obtained. The solution is cooled to less than 50° C., and methanolic hydrochloric acid (equivalent to a 5% excess over the amount of catalyst) is added, followed by reduction of the pressure to 190 mm while sparging with $N_2$ at 50 cc/min. Heating is continued, and after distillation of methanol abates, the pressure is gradually reduced to 2 mm and the pot temperature raised to 150° C. to distill off any excess glycol or alcohol. When distillation is complete, the nitrogen sparge rate is increased to 800 cc/min. and maintained for 15 minutes at 150° C.

After venting to atmospheric pressure and cooling to 100° C., toluene equivalent to about one-third the product volume is added, followed by 0.5 to 1.0% Hyflow Supercel. After 10 minutes of stirring, the mixture is filtered and toluene is vacuum stripped as described above.

Table II contains representative experimental data for polyols prepared from several methyl acrylate and butyl acrylate polymers of the invention by the transesterification procedures described above.

When other polymers of the invention are treated with various alcohols and polyols, including ethylene glycol, propylene glycol, butylene glycol, allyl alcohol, allyloxyethanol, 2-(3-oxazolidinyl)ethanol, dimethylaminoethanol, ethoxyethanol, and the like, similar functional polymers are obtained.

EXAMPLE 34

Preparation of Acrylic Polyurethane Prepolymer

This example describes the preparation of an acrylic polyurethane prepolymer from a polymer of the invention.

To a 500-ml flask fitted with a thermometer, reflux condenser and mechanical stirrer is charged 200 g of the butyl acrylate polymer of Example 16. A polyol polymer from 1,3-butylene glycol is prepared as described in Example 26 to afford a product with OH No. 89 and Acid No. 5.

The mobile, clear pale yellow polyol (75 g) is mixed with 103 g xylene and 28.2 g of isophorone diisocyanate. The mixture is catalyzed with 50 mg dibutyltin dilaurate and heated to 60° C. for 6 hours. The resulting solution prepolymer has a Gardner Holdt viscosity of Al+ and contains 2.76 wt. % isocyanate.

The prepolymer forms useful adhesive and coating compositions with various polyols, polyamines, moisture-activated poly(oxazolidines), masked polyimines, and the like.

Similar compositions are formed when prepolymers formed from the polyols of Examples 26 to 33 are substituted in the above compositions, and when prepolymers formed from other polyols, prepared from polymers of the invention according to the procedures of Examples 23 to 25, are substituted in these compositions.

EXAMPLE 35

Preparation of Polymers

This example describes the use of a polymer of the invention as comonomer in a free-radical polymerization reaction.

A solution copolymer containing 45% methyl methacrylate, 45% ethyl acrylate, and 10% of the polymer of Example 2 is prepared by conventional free-radical techniques in xylene. The resulting solution at 48% solids content has a viscosity of 210 cps/25° C.

Gel permeation chromatography of the product solution discloses that the polymer of Example 2 incorporated into the copolymer, since no significant low molecular weight fractions are eluted. A control chromatogram obtained with the product in the presence of 10 wt. % of the polymer of Example 2 post-added discloses a large fraction of the low molecular weight polymer to be present.

When other polymers of the invention, such as those of Examples 3 to 22, are substituted in the above procedure, similar useful polymers are obtained. Polymers prepared by the above procedure are useful in forming coatings, films, adhesives, fibers, and the like. Incorporating a polymer of the invention as a comonomer is particularly useful for preparing softer polymers in many applications.

It is to be understood that changes and variations may be made without departing from the spirit and scope of the invention as defined by the appended claims.

We claim:

1. An alkoxide-polymerized addition polymer of an ester of acrylic acid, said polymer being a homopolymer or a copolymer with one or more other anionically copolymerizable ethylenically-unsaturated monomers, wherein the average chain length of the polymer, $\bar{n}$, is about 6 to about 30 mers.

2. The polymer of claim 1 wherein at least about 80% by weight of the polymer consists of molecules having chain lengths of about $\bar{n}/3$ to about $3.3\bar{n}$ mers.

3. The polymer of claim 2 wherein $\bar{n}$ is about 6 to about 20.

4. An alkoxide-polymerized addition polymer of an ester of acrylic acid, said polymer being a homopolymer or a copolymer with one or more other anionically copolymerizable ethylenically-unsaturated monomers, said polymer having condensation-crosslinkable functionality, wherein the average chain length of the polymer is about 6 to about 30 mers and wherein at least about 80% by weight of the polymer consists of molecules having chain lengths of about $\bar{n}/3$ to about $3.3\bar{n}$ mers.

5. The polymer of claim 4 wherein the polymer is a copolymer of at least one $(C_1-C_{24})$alkyl acrylate and at least one copolymerized ethylenically-unsaturated ester of acrylic acid having condensation-crosslinkable functionality.

6. The polymer of claim 5 wherein the copolymerized ester is 2-oxazolidinylethyl acrylate or t-butylaminoethyl acrylate.

7. The polymer of claim 6 wherein the alkyl acylate is a $(C_1-C_4)$alkyl acrylate.

8. A polymer of claim 2 wherein the polymer corresponds to the formula $$CH_2=C-(-CH_2-CH\overline{)_{n'}}(-CH_2-CH\overline{)_{n''}}-H$$
$$\phantom{CH_2=C}|\phantom{-(-CH_2-CH\overline{)_{n'}}}|\phantom{(-CH_2-CH\overline{)_{n''}}-}|$$
$$\phantom{CH_2=}COY\phantom{xx}COY\phantom{xxx}COY'$$

wherein Y and Y' are individually halogen, amino, $(C_1-C_4)$-alkylamino, hydroxy$(C_1-C_4)$alkylamino, bis-hydroxy$(C_1-C_4)$alkylamino, $(C_1-C_4)$alkoxy$(C_1-C_4)$-alkylamino, bis$(C_1-C_4)$alkoxy$(C_1-C_4)$alkylamino, or OR;

wherein R is hydrogen, $(C_1-C_8)$aminoalkyl, $(C_1-C_4)$alkylamino$(C_1-C_8)$alkyl, $(C_2-C_8)$isocyanatoalkyl, $(C_2-C_8)$hydroxyalkyl, 1,3-oxazolidin-3-yl$(C_2-C_4)$alkyl, optionally having up to two $(C_1-C_4)$alkyl substituents on the oxazolidinyl ring, $(C_1-C_8)$aldimino$(C_2-C_6)$alkyl, $(C_1-C_8)$aldimino$(C_2-C_6)$alkoxyalkyl, the aldimino structures optionally containing halogen, $(C_3-C_{13})$ketimino$(C_2-C_6)$alkyl, $(C_3-C_{13})$ketimino$(C_2-C_6)$alkoxyalkyl, 1,3-dioxolan-4-yl$(C_2-C_4)$alkyl, optionally having up to two $(C_1-C_8)$hydrocarbon substituents on the dioxolanyl ring, epoxy$(C_2-C_4)$alkyl di$(C_1-C_4)$alkyl ammonium$(C_2-C_8)$epoxy alkyl, 3-chloro-2-hydroxypropyldimethylammoniumethyl, 3-chloro-2-hydroxypropyl, or sodium, potassium or ammonium cation; and wherein n' and n" are integers of 0 to 89, wherein the sum of n' and n" is 2 to 89.

9. The polymer of claim 8 wherein the polymer also comprises mers of $(C_1-C_{24})$alkyl acrylate.

10. The polymer of claim 9 wherein R is $(C_2-C_8)$hydroxyalkyl.

11. The polymer of claim 9 wherein R is 1,3-oxazolidinylethyl or 2-alkyl-1,3-oxazolidinylethyl.

12. The polymer of claim 9 wherein R is hydrogen.

13. The polymer of claim 12 wherein the polymer also comprises mers wherein R is $(C_2-C_8)$hydroxyalkyl.

14. An alkoxide-polymerized addition polymer of an ester of acrylic acid, said polymer being a homopolymer or a copolymer with one or more other anionically copolymerizable ethylenically-unsaturated monomers, the ester of acrylic acid being selected from the group consisting of $(C_1-C_{24})$alkyl esters, di$(C_1-C_4)$alkylamino$(C_2-C_4)$alkyl esters, di$(C_1-C_8)$alkoxyalkyl esters, $(C_6-C_{10})$aryloxyalkyl esters, $(C_7-C_{10})$aralkoxyalkyl esters, and $(C_7-C_{10})$aralkyl esters of acrylic acid, wherein $\bar{n}$, the average chain length of the polymer, is about 6 to 30 mers, and at least about 80% by weight of the molecules of the polymer have chain lengths of about $\bar{n}/3$ to about $3.3\bar{n}$ mers.

15. The polymer of claim 14 wherein the polymer is a homopolymer of an ester of acrylic acid.

16. The polymer of claim 15 wherein the ester is a $(C_1-C_{24})$alkyl acrylate.

17. The polymer of claim 16 wherein the ester is a $(C_1-C_4)$alkyl acrylate.

18. The polymer of claim 14 wherein the polymer is a copolymer of at least two $(C_1-C_{24})$alkyl acrylates.

19. The polymer of claim 14 wherein the polymer is a copolymer of at least one $(C_1-C_{24})$alkyl acrylate and at least one other copolymerizable ethylenically-unsaturated monomer.

20. The polymer of claim 19 wherein the copolymerizable monomer is acrylonitrile or dimethylaminoethyl acrylate.

21. The polymer of claim 20 wherein the alkyl acrylate is a $(C_1-C_4)$alkyl acrylate.

22. The polymer of claim 3 wherein the polymer consists of mers corresponding to the formula $$CH_2=C-(-CH_2-CH\overline{)_{n'}}(-CH_2-CH\overline{)_{n''}}-H$$
$$\phantom{CH_2=C}|\phantom{-(-CH_2-CH\overline{)_{n'}}}|\phantom{(-CH_2-CH\overline{)_{n''}}-}|$$
$$\phantom{CH_2=}COOR\phantom{xx}COOR\phantom{xxx}COOR'$$

wherein R and R' are individually $(C_1-C_{24})$alkyl, di$(C_1-C_4)$alkylamino$(C_1-C_8)$alkyl, $(C_2-C_{12})$alkoxyalkyl, $(C_7-C_{12})$aryloxyalkyl, $(C_9-C_{14})$aralkyloxyalkyl, or $(C_7-C_{10})$aralkyl.

23. An alkoxide-polymerized addition polymer of an ester of acrylic acid, said polymer being a homopolymer or a copolymer with one or more other anionically copolymerizable ethylenically-unsaturated monomers, wherein the polymer comprises mers having the formula

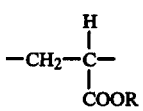

wherein R is acryloyloxyalkyl or methacryloyloxyalkyl having up to 4 carbon atoms in the alkyl portion, and wherein $\bar{n}$, the average chain length of the polymer, is about 6 to 30 mers, and at least about 80% by weight of the molecules of the polymer having chain lengths of about $\bar{n}/3$ to about $3.3\bar{n}$ mers.

24. The polymer of claim 23 wherein the polymer also comprises mers having the formula

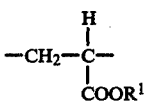

wherein $R^1$ is $(C_1-C_{24})$alkyl.

25. The polymer of claim 24 wherein $R^1$ is $(C_1-C_4)$alkyl.

26. An alkoxide-polymerized addition polymer of an ester of acrylic acid, said polymer being a homopolymer or a copolymer with one or more other anionically copolymerizable ethylenically-unsaturated monomers, wherein the polymer comprises mers having the formula

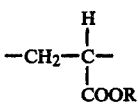

wherein R is $(C_2-C_4)$alkenyl, allyloxyalkyl having up to 12 carbon atoms, or allyloxyalkoxyalkyl having up to 15 carbon atoms, and wherein $\bar{n}$, the average chain length of the polymer, is about 6 to 30 mers, and at least about 80% by weight of the molecules of the polymer have chain lengths of about $\bar{n}/3$ to about $3.3\bar{n}$ mers.

27. The polymer of claim 26 wherein R is allyl.

28. The polymer of claim 26 wherein R is allyloxyethyl.

29. The polymer of claim 26 wherein the polymer also comprises mers having the formula

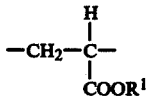

wherein $R^1$ is $(C_1-C_{24})$alkyl.

30. The polymer of claim 29 wherein $R^1$ is $(C_1-C_4)$alkyl.

31. A polymer which is the product of the free-radical polymerization of the polymer of claim 1 with an ethylenically-unsaturated monomer.

32. A process for preparing a polymer of an ester of acrylic acid which comprises the gradual addition of the ester and, optionally, one or more other anionically copolymerizable ethylenically-unsaturated monomers to an alkoxide catalyst system at a temperature of about 20° to 125° C., the amount of catalyst being about 0.5 to about 5 mole percent based on the ester charge.

33. The process of claim 32 in which the catalyst is in a solvent system consisting of an inert solvent and up to about 20 mole percent, based on the ester charge, of an alcohol.

34. The process of claim 3 in which the temperature is 40° to 100° C. and the amount of catalyst being 1 to 4 percent.

* * * * *